US012808293B2

(12) United States Patent
Al-Mousa

(10) Patent No.: US 12,808,293 B2
(45) Date of Patent: Nov. 24, 2026

(54) METHOD AND SYSTEM FOR CORROSION SENSING WITHIN A PIPE COMPONENT IN A WELLBORE

(71) Applicant: SAUDI ARABIAN OIL COMPANY, Dhahran (SA)

(72) Inventor: Ahmed A. Al-Mousa, Al Doha (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 525 days.

(21) Appl. No.: 18/183,652

(22) Filed: Mar. 14, 2023

(65) Prior Publication Data

US 2024/0309748 A1 Sep. 19, 2024

(51) Int. Cl.

*E21B 47/00* (2012.01)
*E21B 47/12* (2012.01)
*G01B 7/06* (2006.01)
*G01N 17/00* (2006.01)
*G05B 13/04* (2006.01)

(52) U.S. Cl.

CPC ............ *E21B 47/006* (2020.05); *E21B 47/12* (2013.01); *G01B 7/10* (2013.01); *G01N 17/006* (2013.01); *G05B 13/042* (2013.01); *E21B 2200/20* (2020.05)

(58) Field of Classification Search

CPC .... E21B 47/006; E21B 47/12; E21B 2200/20; E21B 47/092; G01B 7/10; G01N 17/006; G05B 13/042

See application file for complete search history.

(56) References Cited

U.S. PATENT DOCUMENTS 3,745,452 A * 7/1973 Osburn .................. G01N 17/02 324/559
4,814,706 A * 3/1989 Rempt ................. G01R 33/022 356/477
4,904,940 A * 2/1990 Rampt ................. G01R 33/022 356/477

(Continued)

FOREIGN PATENT DOCUMENTS

CA 2142660 C 2/2002
CN 101846644 B 5/2012

(Continued)

*Primary Examiner* — Edwin J Toledo-Duran
(74) *Attorney, Agent, or Firm* — Osha Bergman Watanabe & Burton LLP

(57) ABSTRACT

A system may include a control system on a well surface and a pipe component disposed in a wellbore. The system may include a first corrosion recorder coupled to the pipe component, with a first magnetic field transmitter and a first magnetic field receiver that generate first corrosion sensor data. The first corrosion recorder may include a first communication interface. A second corrosion recorder with a second communication interface may generate second corrosion sensor data. An optical fiber cable may be disposed in the wellbore couples to the control system, the first corrosion recorder, and the second corrosion recorder. The first corrosion recorder may transmit the first corrosion sensor data to the control system using the first communication interface. The second corrosion recorder may transmit the second corrosion sensor data to the control system using the second communication interface.

17 Claims, 9 Drawing Sheets

(56) References Cited

U.S. PATENT DOCUMENTS

| | | | | | |
|---|---|---|---|---|---|
| 5,132,620 | A * | 7/1992 | Rempt | G01R 33/0327 | 324/71.2 |
| 6,003,597 | A * | 12/1999 | Newman | E21B 43/119 | 166/66.5 |
| 6,294,917 | B1 * | 9/2001 | Nichols | G01V 3/28 | 324/346 |
| 6,534,986 | B2 * | 3/2003 | Nichols | G01V 3/28 | 324/346 |
| 8,165,825 | B2 * | 4/2012 | Legendre | E21B 47/085 | 702/34 |
| 8,456,166 | B2 * | 6/2013 | DePavia | G01V 3/28 | 324/333 |
| 8,564,315 | B2 | 10/2013 | Fisseler et al. | | |
| 8,695,415 | B2 * | 4/2014 | Veneruso | E21B 47/12 | 73/152.52 |
| 10,641,735 | B2 * | 5/2020 | Guner | E21B 47/113 | |
| 11,078,577 | B2 * | 8/2021 | Aljabri | G01R 15/246 | |
| 11,513,099 | B2 * | 11/2022 | Hill, III | G01N 27/904 | |
| 2009/0091328 | A1 * | 4/2009 | Clark | G01V 3/28 | 324/338 |
| 2009/0195244 | A1 * | 8/2009 | Mouget | G01V 3/28 | 324/229 |
| 2010/0308818 | A1 * | 12/2010 | Ceschini | G01N 27/902 | 324/318 |
| 2016/0070018 | A1 * | 3/2016 | Nichols | G01V 3/28 | 324/339 |
| 2016/0168975 | A1 * | 6/2016 | Donderici | G01N 27/90 | 324/238 |
| 2016/0187523 | A1 * | 6/2016 | Sanmartin | E21B 47/006 | 324/339 |
| 2019/0242808 | A1 | 8/2019 | Chen et al. | | |
| 2021/0072185 | A1 * | 3/2021 | Estevez | G01N 27/82 | |
| 2024/0118241 | A1 * | 4/2024 | Ahmed | G01N 27/9006 | |

FOREIGN PATENT DOCUMENTS

| | | | |
|---|---|---|---|
| EP | 1841948 | B1 | 8/2008 |
| WO | 2020136453 | A1 | 7/2020 |

* cited by examiner

400

METHOD AND SYSTEM FOR CORROSION SENSING WITHIN A PIPE COMPONENT IN A WELLBORE

BACKGROUND

Various oil and gas wells use tubular elements as components of the wellbore. However, tubular elements may be subject to corrosion and/or erosion over time. For example, the wellbore may be exposed to water, oil, and/or gas behind the tubular element (such as gas behind the casing) that may cause various chemical reactions with pipe components. These different chemical reactions may impact the casing and thus well integrity over time. Likewise, it may prove difficult to adjust production parameters to account for changes in tubular element conditions without accurate knowledge of casing conditions at various depth intervals and/or well sections.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a system that includes a control system disposed on a well surface, a pipe component disposed in a wellbore, and a first corrosion recorder coupled to the pipe component. The first corrosion recorder includes a first magnetic field transmitter and a first magnetic field receiver. The first magnetic field transmitter and the first magnetic field receiver generate first corrosion sensor data. The first corrosion recorder also includes a first communication interface. The system also includes a second corrosion recorder coupled to the pipe component. The second corrosion recorder includes a second magnetic field transmitter and a second magnetic field receiver. The second magnetic field transmitter and the second magnetic field receiver generate second corrosion sensor data. The second corrosion recorder also includes a second communication interface. The system also includes an optical fiber cable disposed in the wellbore and coupled to the control system, the first corrosion recorder, and the second corrosion recorder. The first corrosion recorder transmits the first corrosion sensor data to the control system using the first communication interface. The second corrosion recorder transmits the second corrosion sensor data to the control system using the second communication interface. The first corrosion recorder and the second corrosion recorder are separated by a predetermined distance within the wellbore.

In general, in one aspect, embodiments relate to an apparatus that includes a magnetic field transmitter, a magnetic field receiver, a sealed case, a fiber optic connector configured to couple to an optical fiber cable, a communication interface coupled to the fiber optic connector, a processor coupled to the magnetic field transmitter, the magnetic field receiver, and the communication interface, and a memory coupled to the processor. The memory includes instructions to perform a method. The method steps include to obtain a command to generate corrosion sensor data, generate the corrosion sensor data using the magnetic field receiver and the magnetic field transmitter, and transmit the corrosion sensor data over the optical fiber cable using the communication interface.

In general, in one aspect, embodiments relate to a method that includes transmitting, by a control system, a first command to a first corrosion recorder in a wellbore. The method includes transmitting, by the control system, a second command to a second corrosion recorder in the wellbore. The first corrosion recorder and the second corrosion recorder are separated by a predetermined distance within the wellbore. The method includes obtaining, by the control system in response to transmitting the first command, first corrosion sensor data from the first corrosion recorder. The method includes obtaining, by the control system in response to transmitting the second command, second corrosion sensor data from the second corrosion recorder. The first corrosion sensor data and the second corrosion sensor data are generated using various magnetic field receivers and various magnetic field transmitters. The first corrosion sensor data describes a first portion of a pipe component disposed in the wellbore. The second corrosion sensor data describes a second portion of the pipe component that is different from the first portion.

In light of the structure and functions described above, embodiments of the invention may include respective means adapted to carry out various steps and functions defined above in accordance with one or more aspects and any one of the embodiments of one or more aspect described herein.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for monitoring one or more pipe sections of a wellbore for corrosion. In particular, monitoring corrosion may prove difficult in a wellbore, especially throughout the life of a wellbore. Past techniques to analyze corrosion uses various wireline methods that lowered monitoring equipment into a well with running tools to measure corrosion. Rather than using well running operations, some embodiments provide a permanent system for recording and collecting corrosion sensor data continuously for various pipe components. Examples of pipe components may include various tubulars, such as casing pipes and tubing pipes. Moreover, various corrosion recorders may be disposed at different depth intervals to analyze different sections of pipe. Using a communication cable (e.g., an optical fiber cable), the corrosion records may communicate corrosion sensor data with well surface equipment, such as a control system. In some embodiments, corrosion sensor data at different locations are combined to generate a corrosion log of a wellbore. In a corrosion log, corrosion measurements may be described as a function of depth in the wellbore. By collecting corrosion data over time, changes to the wellbore may be simulated and predicted, such as for maintenance operations and tubular replacement operations.

Figure 1:
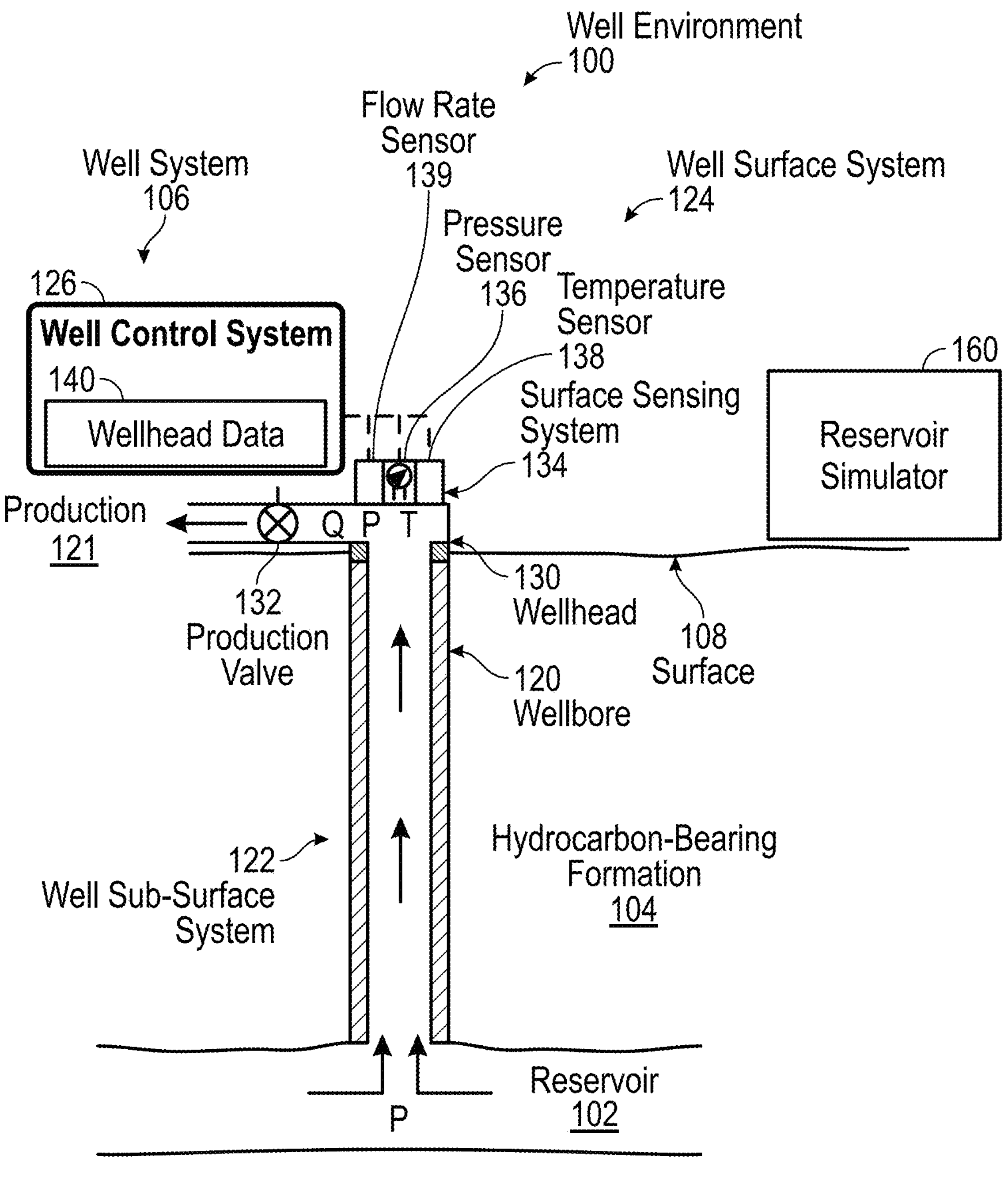
FIGS. 1, 2, 3, 4, 5A, 5B, and 5C show systems in accordance with one or more embodiments.

Turning to FIG. 1, FIG. 1 shows a schematic diagram in accordance with one or more embodiments. As shown in FIG. 1, FIG. 1 illustrates a well environment (100) that includes a hydrocarbon reservoir ("reservoir") (102) located in a subsurface hydrocarbon-bearing formation (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, and resistivity. In the case of the well system (106) being operated as a production well, the well system (106) may facilitate the extraction of hydrocarbons (or "production") from the reservoir (102).

In some embodiments, the well system (106) includes a wellbore (120), a well sub-surface system (122), a well surface system (124), and a well control system (126). The well control system (126) may control various operations of the well system (106), such as well production operations, well completion operations, well maintenance operations, and reservoir monitoring, assessment, and development operations. In some embodiments, the well control system (126) includes a computer system that is the same as or similar to that of computer system (e.g., a computer (702)) described below in FIG. 7 and the accompanying description.

The wellbore (120) may include a bored hole that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "downhole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) into the hydrocarbon-bearing formation (104) or the reservoir (102) during monitoring operations (e.g., during in situ logging operations).

In some embodiments, during operation of the well system (106), the well control system (126) collects and records wellhead data (140) for the well system (106) and other data regarding downhole equipment and downhole sensors (e.g., using a corrosion sensing system described below in FIG. 2 and the accompanying description). The wellhead data (140) may include, for example, a record of measurements of wellhead pressure (P) (e.g., including flowing wellhead pressure (FWHP)), wellhead temperature (T) (e.g., including flowing wellhead temperature), wellhead production rate (Q) over some or all of the life of the well system (106), and water cut data. In some embodiments, the measurements are recorded in real-time, and are available for review or use within seconds, minutes or hours of the condition being sensed (e.g., the measurements are available within 1 hour of the condition being sensed). In such an embodiment, the wellhead data (140) may be referred to as "real-time" wellhead data. Real-time wellhead data may enable an operator of the well system (106) to assess a relatively current state of the well system (106), and make real-time decisions regarding development of the well system (106) and the reservoir (102), such as on-demand adjustments in regulation of production flow from the well.

With respect to water cut data, the well system (106) may include one or more water cut sensors. For example, a water cut sensor may be hardware and/or software with functionality for determining the water content in oil, also referred to as "water cut." Measurements from a water cut sensor may be referred to as water cut data and may describe the ratio of water produced from the wellbore (120) compared to the total volume of liquids produced from the wellbore (120). In some embodiments, a water-to-gas ratio (WGR) is determined using a multiphase flow meter. For example, a multiphase flow meter may use magnetic resonance information to determine the number of hydrogen atoms in a particular fluid flow. Since oil, gas and water all contain hydrogen atoms, a multiphase flow may be measured using magnetic resonance. In particular, a fluid may be magnetized and subsequently excited by radio frequency pulses. The hydrogen atoms may respond to the pulses and emit echoes that are subsequently recorded and analyzed by the multiphase flow meter.

In some embodiments, the well surface system (124) includes a wellhead (130). The wellhead (130) may include a rigid structure installed at the "up-hole" end of the wellbore (120), at or near where the wellbore (120) terminates at the surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more of a production valve (132) that are operable to control the flow of production (121). For example, a production valve (132) may be fully opened to enable unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

Keeping with FIG. 1, in some embodiments, the well surface system (124) includes a surface sensing system (134). The surface sensing system (134) may include sensor devices for sensing characteristics of substances, including production (121), passing through or otherwise located in the well surface system (124). The characteristics may include, for example, pressure, temperature, and flow rate of production (121) flowing through the wellhead (130), or other conduits of the well surface system (124), after exiting the wellbore (120).

In some embodiments, the surface sensing system (134) includes a surface pressure sensor (136) operable to sense the pressure of production (121) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (121) flowing through the well surface system (124), after it exits the wellbore (120). The surface temperature sensor (138) may include, for example, a wellhead temperature sensor that senses a temperature of production (121) flowing through or otherwise located in the wellhead (130), referred to as "wellhead temperature" (T). In some embodiments, the surface sensing system (134) includes a flow rate sensor (139) operable to sense the flow rate of production (121) flowing through the well surface system (124), after it exits the wellbore (120). The flow rate sensor (139) may include hardware that senses a flow rate of production (121) (Q) passing through the wellhead (130).

Keeping with FIG. 1, when completing a well, one or more well completion operations may be performed prior to delivering the well to the party responsible for production or injection. Well completion operations may include casing operations, cementing operations, perforating the well, gravel packing, directional drilling, hydraulic stimulation of a reservoir region, and/or installing a production tree or wellhead assembly at the wellbore (120). Likewise, well operations may include open-hole completions or cased-hole completions. For example, an open-hole completion may refer to a well that is drilled to the top of the hydrocarbon reservoir. Thus, the well may be cased at the top of the reservoir and left open at the bottom of a wellbore. In contrast, cased-hole completions may include running casing into a reservoir region.

In one well completion example, the sides of the wellbore (120) may require support, and thus casing may be inserted into the wellbore (120) to provide such support. After a well has been drilled, casing may ensure that the wellbore (120) does not close in upon itself, while also protecting the wellstream from outside contaminants, like water or sand. Likewise, if the formation is firm, casing may include a solid string of steel pipe that is run in the well and will remain that way during the life of the well. In some embodiments, the casing includes a wire screen liner that blocks loose sand from entering the wellbore (120).

In another well operation example, a space between the casing and the untreated sides of the wellbore (120) may be cemented to hold a casing in place. This well operation may include pumping cement slurry into the wellbore (120) to displace existing drilling fluid and fill in this space between the casing and the untreated sides of the wellbore (120). Cement slurry may include a mixture of various additives and cement. After the cement slurry is left to harden, cement may seal the wellbore (120) from non-hydrocarbons that attempt to enter the wellstream. In some embodiments, the cement slurry is forced through a lower end of the casing and into an annulus between the casing and a wall of the bored hole of the wellbore (120). More specifically, a cementing plug may be used for pushing the cement slurry from the casing. For example, the cementing plug may be a rubber plug used to separate cement slurry from other fluids, reducing contamination and maintaining predictable slurry performance. A displacement fluid, such as water, or an appropriately weighted drilling fluid, may be pumped into the casing above the cementing plug. This displacement fluid may be pressurized fluid that serves to urge the cementing plug downward through the casing to extrude the cement from the casing outlet and back up into the annulus.

Keeping with well operations, some embodiments include perforation operations. More specifically, a perforation operation may include perforating casing and cement at different locations in the wellbore (120) to enable hydrocarbons to enter a wellstream from the resulting holes. For example, some perforation operations include using a perforation gun at one or more reservoir levels to produce holed sections through the casing, cement, and sides of the wellbore (120). Hydrocarbons may then enter the wellstream through these holed sections. In some embodiments, perforation operations are performed using discharging jets or shaped explosive charges to penetrate the casing around the wellbore (120).

In another well completion, a filtration system may be installed in the wellbore (120) in order to prevent sand and other debris from entering the wellstream. For example, a gravel packing operation may be performed using a gravel-packing slurry of appropriately sized pieces of coarse sand or gravel. As such, the gravel-packing slurry may be pumped into the wellbore (120) between a casing's slotted liner and the sides of the wellbore (120). The slotted liner and the gravel pack may filter sand and other debris that might have otherwise entered the wellstream with hydrocarbons. In another well completion, a wellhead assembly may be installed on the wellhead of the wellbore (120). A wellhead assembly may include a production tree (also called a Christmas tree) that includes valves, gauges, and other components to provide surface control of subsurface conditions of a well.

In some embodiments, a wellbore (120) includes one or more casing centralizers. For example, a casing centralizer may be a mechanical device that secures casing at various locations in a wellbore to prevent casing from contacting the walls of the wellbore. Thus, casing centralization may produce a continuous annular clearance around casing such that cement may be used to completely seal the casing to walls of the wellbore. Without casing centralization, a cementing operation may experience mud channeling and poor zonal isolation. Examples of casing centralizers may include bow-spring centralizers, rigid centralizers, semi-rigid centralizers, and mold-on centralizers. In particular, bow springs may be slightly larger than a particular wellbore in order to provide complete centralization in vertical or slightly deviated wells. On the other hand, rigid centralizers may be manufactured from solid steel bar or cast iron with a fixed blade height in order to fit a specific casing or hole size. Rigid centralizers may perform well even in deviated wellbores regardless of any particular side forces. Semi-rigid centralizers may be made of double crested bows and operate as a hybrid centralizer that includes features of both bow-spring and rigid centralizers. The spring characteristic of the bow-spring centralizers may allow the semi-rigid centralizers to compress in order to be disposed in tight spots in a wellbore. Mold-on centralizers may have blades made of carbon fiber ceramic material that can be applied directly to a casing surface.

In some embodiments, well intervention operations may also be performed at a well site. For example, well intervention operations may include various operations carried out by one or more service entities for an oil or gas well during its productive life (e.g., hydraulic fracturing operations, coiled tubing, flow back, separator, pumping, wellhead and production tree maintenance, slickline, braided line, coiled tubing, snubbing, workover, subsea well intervention, etc.). For example, well intervention activities may be similar to well completion operations, well delivery operations, and/or drilling operations in order to modify the state of a well or well geometry. In some embodiments, well intervention operations are used to provide well diagnostics, and/or manage the production of the well. With respect to service entities, a service entity may be a company or other actor that performs one or more types of oil field services, such as well operations, at a well site. For example, one or more service entities may be responsible for performing a cementing operation in the wellbore (120) prior to delivering the well to a producing entity.

Turning to the reservoir simulator (160), a reservoir simulator (160) may include hardware and/or software with functionality for performing a well simulation such as storing and analyzing well logs, production data, sensor data (e.g., from a wellhead, downhole sensor devices, or flow control devices), and/or other types of data to generate and/or update one or more geological models of one or more reservoir regions. Geological models may include geochemical or geomechanical models that describe structural relationships within a particular geological region. Likewise, a reservoir simulator (160) may also determine changes in reservoir pressure and other reservoir properties for a geological region of interest, e.g., in order to evaluate the health of a particular reservoir during the lifetime of one or more producing wells While the reservoir simulator (160) is shown at a well site, in some embodiments, the reservoir simulator (160) or other components in FIG. 1 may be remote from a well site. In some embodiments, the reservoir simulator (160) is implemented as part of a software platform for the well control system (126). The software platform may obtain data acquired by a control system as inputs, which may include multiple data types from multiple sources. The software platform may aggregate the data from these systems in real time for rapid analysis. In some embodiments, the well control system (126) and the reservoir simulator (160), and/or a user device coupled to one of these systems may include a computer system that is similar to the computer system (702) described below with regard to FIG. 7 and the accompanying description.

Figure 2:
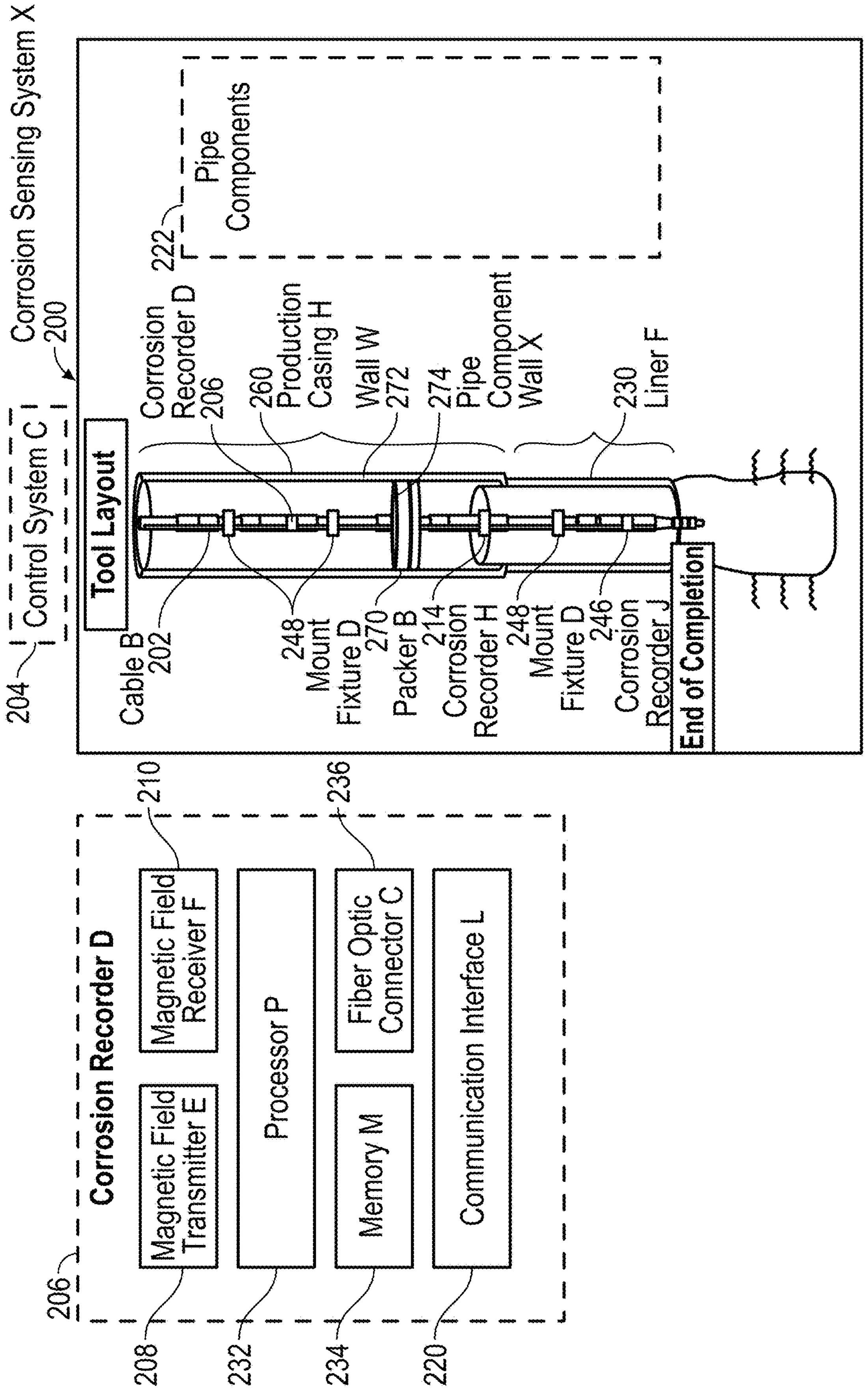

Turning to FIG. 2, FIG. 2 shows a schematic diagram in accordance with one or more embodiments. As illustrated in FIG. 2, a corrosion sensing system (e.g., corrosion sensing system X (200)) may include one or more control systems (e.g., control system C (204)), various pipe components (e.g., pipe components (222)), one or more communication cables (e.g., cable B (202)), one or more corrosion recorders (e.g., corrosion recorder D (206), corrosion recorder H (214), corrosion recorder J (246)). For example, a corrosion recorder may include a magnetic field transmitter (e.g., magnetic field transmitter E (208), magnetic field transmitter J (216)), a magnetic field receiver (e.g., magnetic field receiver F (210), magnetic field receiver K (218)), and a communication interface (e.g., communication interface L (220)). In particular, a magnetic field transmitter may transmit magnetic flux waves through a ferromagnetic material to cause a magnetic field. Likewise, the magnetic field receiver may detect a flux leakage caused by one or more defects in the ferromagnetic material. For example, a defect may correspond with a corroded area of a tubular element. Pipe components may include one or more casings, a tubing, a drill pipe a liner assembly (e.g., liner F (230)), and/or a production casing (e.g., production casing H (260)). In some embodiments, a communication cable is an optical fiber cable that couples one or more control systems on a well surface to one or more corrosion recorders in a wellbore. Each optical fiber may be coated in a robust material such as a plastic. Each optical fiber may be wound in a helix or other form with other optical fibers and/or with wires for electrical communication and/or for structural properties. The optical fiber may be housed in a tube such as a stainless-steel tube suitable for the environment in which the optical fiber cable is installed, e.g., an oil and gas well. The control system may transmit, over the optical fiber cable, a command to one or more corrosion recorders. Likewise, a corrosion recorder system may collect corrosion sensor data using a network protocol over the same or a different communication cable. As such, network messages may be transmitted between a control system and corrosion recorders using various communication interfaces.

Staying with FIG. 2, in some embodiments, one or more of the corrosion recorders include a processor (e.g., processor P (232)), a memory (e.g., memory M (234)), and an optical fiber connector or fiber optic connector (e.g., fiber optic connector C (236)) that couples to optical fiber cable. The communication interface may be coupled to the fiber optic connector and configured to transmit the corrosion sensor data regarding a corrosion region of interest to a control system. A corrosion recorder may include a mount fixture (e.g., mount fixture D (248)) that couples the corrosion recorder to a pipe component. The mount fixture may be made using suitable materials such as stainless steel, titanium, corrosion-resistant alloys, hot-rolled steel, cold-rolled steel, aluminum, fiberglass, plastic, and the like for disposing a corrosion recorder at a predetermined position in relation to a pipe component. The corrosion recorders may include a sealed case made of a suitable material for the environment in which the corrosion recorders are installed, e.g., an oil and gas well. The sealed case may be made using suitable materials such as stainless steel, titanium, corrosion-resistant alloys, hot-rolled steel, cold-rolled steel, aluminum, fiberglass, plastic, and the like. The sealed case may protect internal components (e.g., magnetic field transmitter, magnetic field receiver, communication interface) of the corrosion recorders from the corrosive environment of a well. The sealed case may also avoid damage to internal components during a well operation that includes running tubular elements such as casing and tubing in a wellbore.

Figure 4:
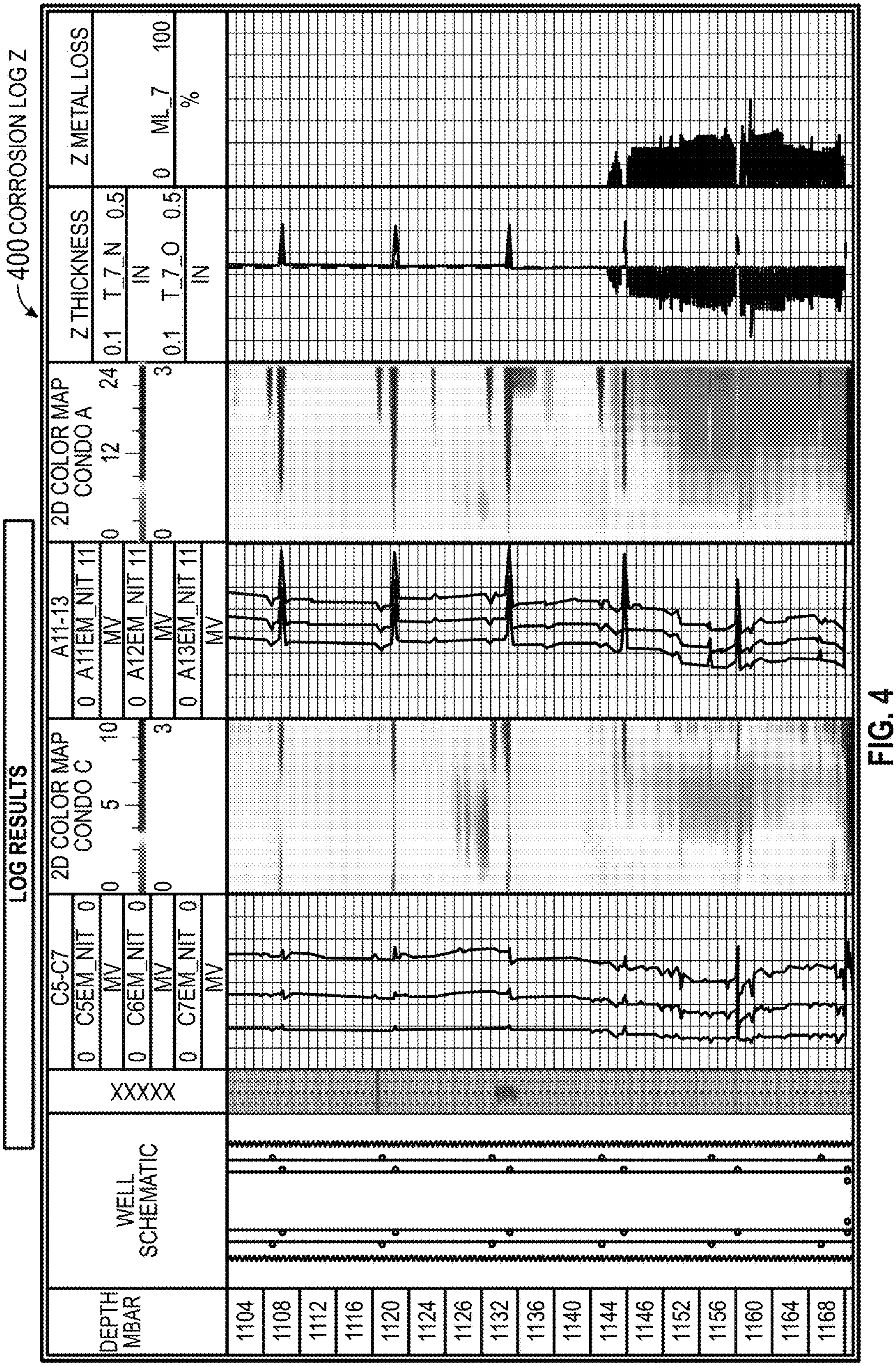

In some embodiments, a corrosion log is generated from corrosion sensor data. A corrosion log may be a data record that is obtained using a corrosion sensing system. Likewise, corrosion sensor data may also be monitored at a well continuously in real-time. An example of a corrosion log is illustrated in FIG. 4, which shows corrosion log Z (400) in accordance with one or more embodiments. Monitoring casing conditions may include monitoring for excessive corrosion or for gas behind the casing that might impact the well integrity. For example, wall thickness, corrosion levels, and the presence of gas may be monitored behind the casing in an oil and gas well. In particular, a high corrosion level in one or more pipe components may can require installation of a casing patch or abandoning the well. Implementation of permanent monitoring may also allow continually monitoring of the well to determine the degree or magnitude of corrosion. Thus, corrosion monitoring may be used to make decisions regarding a wellbore.

Staying with FIG. 2, in some embodiments, the wellbore may include a packer (e.g., packer B (270)) positioned between the first corrosion recorder and the second corrosion recorder. The packer may be a feed-through packer positioned in the first section of the wellbore. The feed-through packer may scal on a wall (e.g., a wall W (272)) of the wellbore and/or on a wall of the pipe component (e.g., a pipe component wall X (274)). In some embodiments the feed-through packer(s) may seal against the formation wall such as the hydrocarbon-bearing formation of the drilled hole. In some embodiments the feed-through packer may allow feeding through the optical fiber cable from the first section of the wellbore to the second section of the wellbore. In some embodiments more than one packer may be used, the various packers may be positioned at various depths, and the packers may allow feeding through the optical fiber cable from each of the various packers.

In some embodiments, a corrosion recorder is positioned at one depth interval in a casing section above a packer and another corrosion recorder may be positioned at another depth interval below the packer. As such, corrosion recorders may be separated by predetermined distances for analyzing pipe components throughout a wellbore. The packer may be a feed-through style packer to accommodate a communication cable crossing from an up-hole side of the packer to a downhole side. The feed-through packer may include a feature, such as a gland and gland nut pair, that seals the communication cable to prevent pressure and flow communication along an accommodation path, such as a hole or a port, of the cable that feeds through the packer. Packers may isolate an annulus and anchor tubular elements in a wellbore. The packer may be based on wellbore geometry and operational characteristics of the wellbore fluids, such as completion and reservoir fluids. The packer may be a retrievable packer or a permanent packer. Furthermore, a communication cable may continue to another corrosion recorder located at the third depth interval below the second corrosion recorder.

Figure 3:
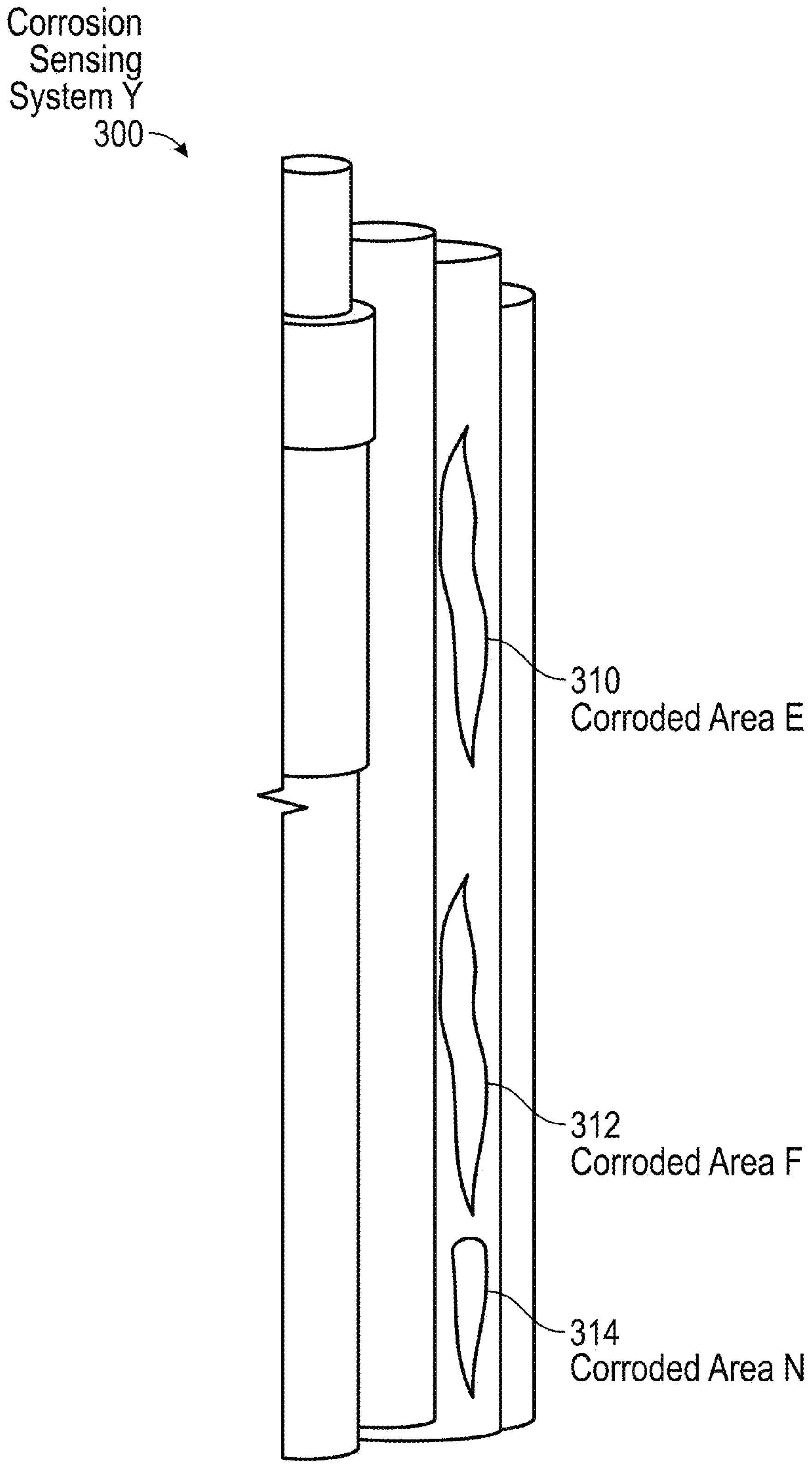

Staying with FIG. 2, in some embodiments, a control system may determine a wall thickness of a predetermined section of a pipe component using corrosion sensor data. For example, a control system may determine whether the wall thickness of the predetermined section satisfies a predetermined criterion. The control system may terminate a production operation at the wellbore in response to determining that the pipe component fails to satisfy the predetermined criterion. In some embodiments, a predetermined criterion corresponds to a wall thickness falling below a satisfactory threshold, such as for operation or safety of a well. In particular, the predetermined criterion may be a predetermined difference between a casing wall thickness specification at the time of manufacture of the casing and the current wall thickness determined by a corrosion sensing system. For example, a new casing wall may have a thickness measurement of 1", a determined wall may be ¾", and therefore a wall loss may be ¼". The predetermined criterion may be a wall loss maximum of ⅛" or a wall thickness remaining of ⅞". In this example the wall loss of ¼" of the predetermined section fails to satisfy the predetermined criterion of a wall loss maximum of ⅛" or a wall thickness remaining of ⅞". In this case the control system may adjust one or more production parameters of the production operation. Examples of adjusting production parameters may include adjusting the production rate, adjusting the corrosion inhibitor injection rate and/or schedule, and terminating the production operation. Turning to FIG. 3, FIG. 3 shows an embodiment of the corrosion sensing system (e.g., corrosion sensing system Y (300)) that determines the location of various corrosion areas (e.g., corroded area E (310), corroded area F (312), corroded area N (314)) at different depth intervals.

Figure 5A:
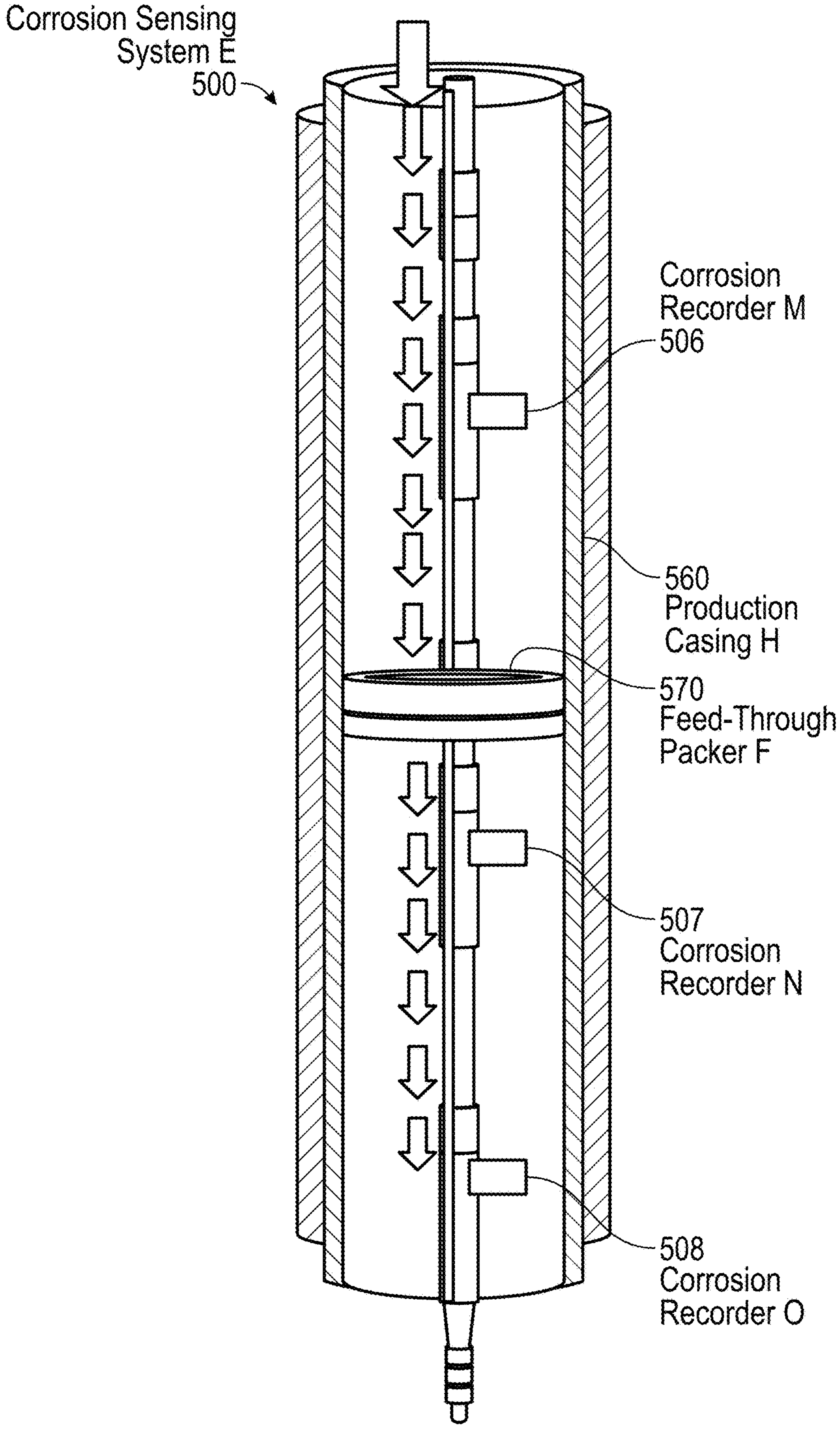
Figure 5B:
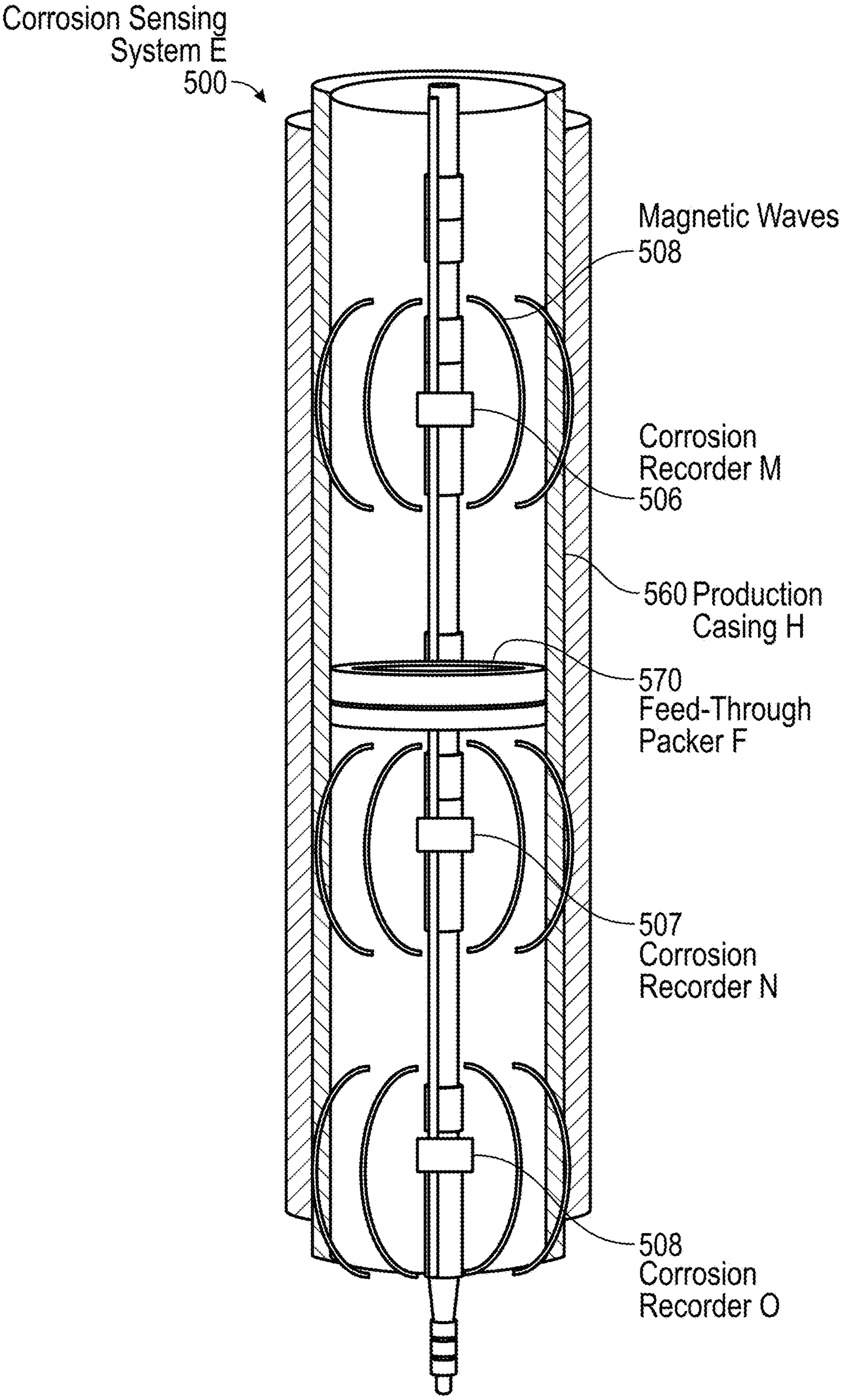
Figure 5C:
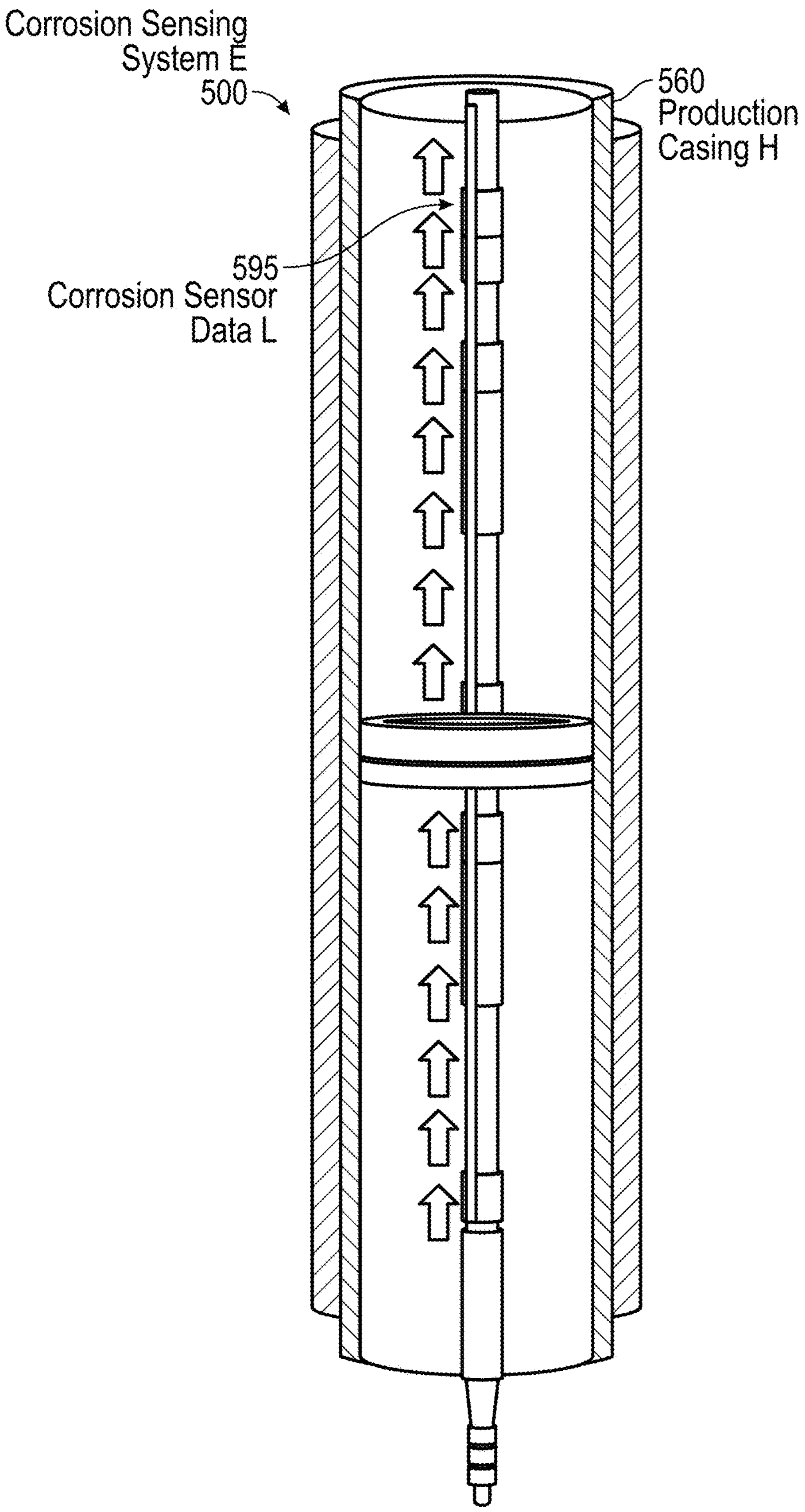

Turning to FIGS. 5A, 5B, and 5C, FIGS. 5A-5C show various examples in accordance with one or more embodiments. FIG. 5A shows a corrosion sensing system E (500), where a command signal is sent from a control system (not shown) to corrosion recorder M (506), corrosion recorder N (507), and corrosion recorder O (508). After receiving the command signal, the corrosion recorders (506, 507, 508) start collecting corrosion sensor data to generate a corrosion log. FIG. 5B shows the corrosion recorders (506, 507, 508) using magnetic waves (e.g., magnetic waves W (508)) at various depths within a production casing H (560). As shown in FIG. 5A, a feed-through packer F (570) may be used in the wellbore to provide a positional reference regarding the location of different corrosion recorders. In FIG. 5C, corrosion sensor data L (595) are transmitted up a communication cable to the control system, where the corrosion sensor L (595) may describe sensor measurements regarding remaining metal thickness of the well completion elements of the production casing H (560). The corrosion sensor data L (595) may be processed by the control system to produce a corrosion log, accordingly.

Returning to FIG. 2, one or more control systems may include hardware and/or software for collecting sensor data and equipment data from the various corrosion recorders. For example, a control system may include one or more programmable logic controllers (PLCs) that include hardware and/or software with functionality to control one or more processes performed by a corrosion sensing system. A programmable logic controller (PLC) may be a ruggedized computer system with functionality to withstand vibrations, extreme temperatures, wet conditions, and/or dusty conditions, for example, around a drilling rig or a well site. In some embodiments, the control system includes functionality for controlling one or more well operations such as production operations, at a well site. For example, a programmable logic controller may control valve states, fluid levels, pipe pressures, warning alarms, and/or pressure releases throughout well equipment. Without loss of generality, the term "control system" may refer to a production operation control system that is used to operate and control well equipment, a data acquisition control system that is used to acquire well data and/or sensor data to monitor well operations, or a well interpretation software system that is used to analyze and understand well events and production progress. In some embodiments, the control system C (204) may include a computer system that is similar to the computer system (e.g., computer (702)) and/or the well control system (126) described with respect to FIGS. 1 and 7 and the accompanying description, respectively.

While FIGS. 1, 2, 3, 4, 5A, 5B, and 5C show various configurations of hardware components and/or software components, other configurations may be used without departing from the scope of the disclosure. For example, various components in FIGS. 1, 2, 3, 4, 5A, 5B, and 5C may be combined to create a single component. As another example, the functionality performed by a single component may be performed by two or more components.

Figure 6:
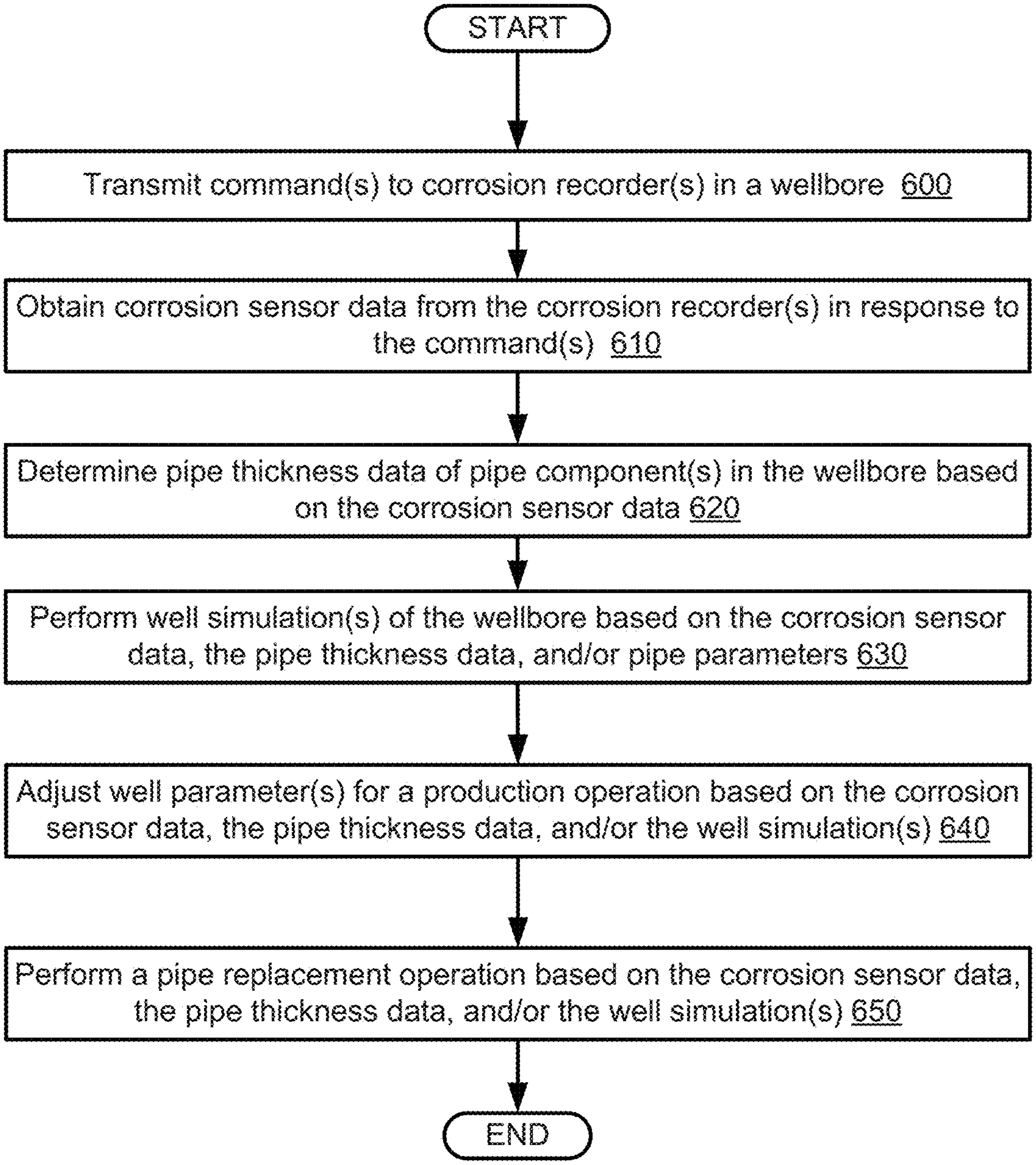
FIG. 6 shows a flowchart in accordance with one or more embodiments.

Turning to FIG. 6, FIG. 6 shows a flowchart in accordance with one or more embodiments. Specifically, FIG. 6 describes a general method using a corrosion sensing to monitor corrosion in various pipe components in a wellbore. One or more blocks in FIG. 6 may be performed by one or more components (e.g., control system C (204) or corrosion recorder D (206)) as described in FIGS. 1, 2, 3, 4, 5A, 5B, and 5C. While the various blocks in FIG. 6 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 600, one or commands are transmitted one or more corrosion recorders in a wellbore in accordance with one or more embodiments. For example, an optical fiber cable may be coupled to a control system and corrosion recorders using the fiber optic connectors. The corrosion recorders may be coupled to the tubular element(s) with the mount fixture similar to the mount fixture described above in FIG. 2 and the accompanying description. Any number of commands may be sent to any number of corrosion recorders.

In Block 610, corrosion sensor data are obtained from one or more corrosion recorders in response to one or more commands in accordance with one or more embodiments.

In particular, sensor data may include tubular element wall thickness correlated with a time and date stamp to create a history. Corrosion sensor data may be obtained from the corrosion recorder(s) in response to receipt of a transmitted command(s). The control system may transmit the command. The first corrosion sensor data and the second corrosion sensor data are generated using one or more magnetic field receivers and one or more magnetic field transmitters.

In Block 620, a pipe thickness data of one or more pipe components are determined in a wellbore based on corrosion sensor data in accordance with one or more embodiments.

In Block 630, one or more well simulations of a wellbore are performed based on corrosion sensor data, pipe thickness data, and/or various pipe parameters in accordance with one or more embodiments. For example, a control system or a simulator device may use sensor data from a corrosion sensing system to solve various well equations in a particular simulation. In particular, corrosion sensor data may be used with wellhead data, geological data, and other types of data to predict the state of a wellbore and future well operations. Moreover, well simulations may include history matching such as matching the magnitude of corrosion over time, predicting a date or a range of dates for a pipe replacement operation, production rates at one or more wells and correlating the production rate with a corrosion rate, and determining the presence of gas behind the casing, monitoring gas behind the casing to avoid casing leaks. A well simulation may be performed for the purpose of determining a future date for a pipe replacement operation.

In Block 640, one or more well parameters are adjusted for a production operation based on corrosion sensor data, pipe thickness data, and/or one or more well simulations in accordance with one or more embodiments. For example, a production operation at the wellbore may be terminated (e.g., shut in the well) if a predetermined section (e.g., a depth interval) fails to satisfy the predetermined criterion (e.g., wall thickness remaining). Other examples of adjusting production parameters may include one or more of adjusting the production rate, adjusting the corrosion inhibitor injection rate, adjusting the corrosion inhibitor injection schedule, adjusting the corrosion inhibitor chemistry and/or concentration, or reducing the pressure of gas behind the casing.

In Block 650, a pipe replacement operation is performed based on corrosion sensor data, pipe thickness data, and/or one or more well simulations in accordance with one or more embodiments.

Figure 7:
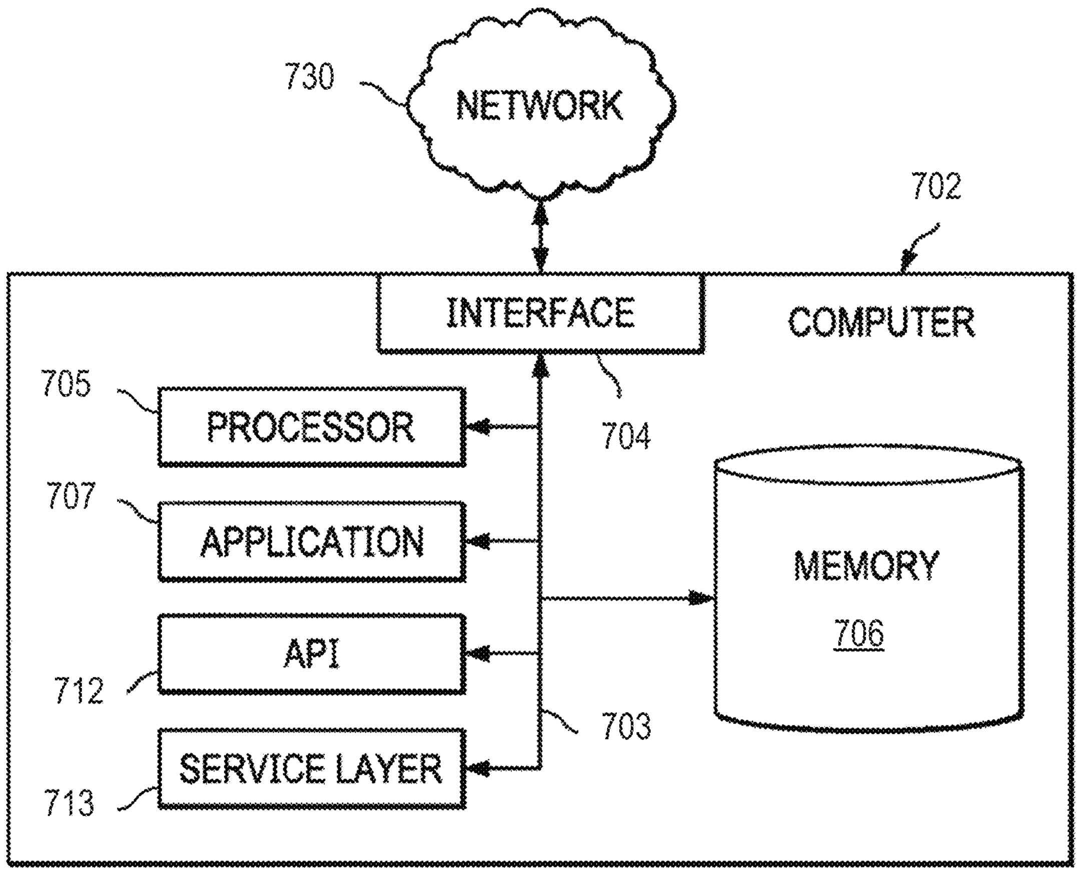
FIG. 7 shows a computer system in accordance with one or more embodiments.

Embodiments may be implemented on a computer system. FIG. 7 is a block diagram of a computer system such as the computer (702) used to provide computational functionalities associated with described algorithms, methods, functions, processes, flows, and procedures as described in the instant disclosure, according to an implementation. The illustrated computer (computer (702)) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (702) may include a computer that includes an input device, such as a keypad, keyboard, touch screen, or other device that can accept user information, and an output device that conveys information associated with the operation of the computer (702), including digital data, visual, or audio information (or a combination of information), or a graphical user interface.

The computer (702) can serve in a role as a client, network component, a server, a database or other persistency, or any other component (or a combination of roles) of a computer system for performing the subject matter described in the instant disclosure. The illustrated computer (computer (702)) is communicably coupled with a network (730). In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence server, or other server (or a combination of servers).

The computer (702) can receive requests over network (730) from a client application (for example, executing on another computer (702)) and responding to the received requests by processing the said requests in an appropriate software application. In addition, requests may also be sent to the computer (702) from internal users (for example, from a command console or by other appropriate access method), external or third-parties, other automated applications, as well as any other appropriate entities, individuals, systems, or computers.

Each of the components of the computer (702) can communicate using a system bus (703). In some implementations, any or all of the components of the computer (702), both hardware or software (or a combination of hardware and software), may interface with each other or the interface (704) (or a combination of both) over the system bus (703) using an application programming interface (an API (712)) or a service layer (713) (or a combination of the API (712)

and service layer (713). The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702). The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or other suitable format. While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single one of interface (704) in FIG. 7, two or more of the interface (704) may be used according to particular needs, desires, or particular implementations of the computer (702). The interface (704) is used by the computer (702) for communicating with other systems in a distributed environment that are connected to the network (730). Generally, the interface (704) includes logic encoded in software or hardware (or a combination of software and hardware) and operable to communicate with the network (730). More specifically, the interface (704) may include software supporting one or more communication protocols associated with communications such that the network (730) or interface's hardware is operable to communicate physical signals within and outside of the illustrated computer (computer (702)).

The computer (702) includes at least one of a computer processor (705). Although illustrated as a single one of the computer processor (705) in FIG. 7, two or more processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a memory (706) that holds data for the computer (702) or other components (or a combination of both) that can be connected to the network (730). For example, memory (706) can be a database storing data consistent with this disclosure. Although illustrated as a single one of memory (706) in FIG. 7, two or more memories may be used according to particular needs, desires, or particular implementations of the computer (702) and the described functionality. While memory (706) is illustrated as an integral component of the computer (702), in alternative implementations, memory (706) can be external to the computer (702).

The application (707) is an algorithmic software engine providing functionality according to particular needs, desires, or particular implementations of the computer (702), particularly with respect to functionality described in this disclosure. For example, application (707) can serve as one or more components, modules, applications, etc. Further, although illustrated as a single one of application (707), the application (707) may be implemented as a multiple quantity of application (707) on the computer (702). In addition, although illustrated as integral to the computer (702), in alternative implementations, the application (707) can be external to the computer (702).

There may be any number of computers such as the computer (702) associated with, or external to, a computer system containing computer (702), each computer (702) communicating over network (730). Further, the term "client," "user," and other appropriate terminology may be used interchangeably as appropriate without departing from the scope of this disclosure. Moreover, this disclosure contemplates that many users may use one of computer (702), or that one user may use multiple computers such as computer (702).

In some embodiments, the computer (702) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A system comprising:

a control system disposed on a well surface within a well environment;

a pipe component disposed in a wellbore within the well environment;

a first corrosion recorder coupled to the pipe component, the first corrosion recorder comprising:

a first magnetic field transmitter, a first magnetic field receiver, wherein the first magnetic field transmitter and the first magnetic field receiver are configured to generate first corrosion sensor data, and a first communication interface;

a second corrosion recorder coupled to the pipe component, the second corrosion recorder comprising:

a second magnetic field transmitter, a second magnetic field receiver, wherein the second magnetic field transmitter and the second magnetic field receiver are configured to generate second corrosion sensor data, and a second communication interface; and an optical fiber cable disposed in the wellbore and coupled to the control system, the first corrosion recorder, and the second corrosion recorder, wherein the first corrosion recorder is configured to transmit, over the optical fiber cable, the first corrosion sensor data to the control system using the first communication interface, and wherein the second corrosion recorder is configured to transmit, over the optical fiber cable, the second corrosion sensor data to the control system using the second communication interface, wherein the first corrosion recorder and the second corrosion recorder are separated by a predetermined distance within the wellbore, wherein the first corrosion recorder and the second corrosion recorder are permanently installed in the wellbore during production operations and are configured to continuously monitor corrosion of the pipe component over a life of the well, and wherein the control system is configured to:

perform a well simulation of the wellbore using corrosion sensor data obtained over time from the first corrosion recorder, the second corrosion recorder, pipe thickness data, and pipe parameters; and determine a predicted pipe replacement date for the well using the well simulation.

2. The system of claim 1, wherein the first corrosion recorder further comprises a processor, a memory, and a fiber optic connector configured to couple to the optical fiber cable, wherein the first corrosion recorder is configured to receive, over the optical fiber cable and from the control system, a request to acquire the first corrosion sensor data, and wherein the memory is configured to store the first corrosion sensor data until the first corrosion sensor data is transmitted to the control system.

3. The system of claim 1, wherein the first corrosion recorder comprises a mount fixture configured to permanently couple the first corrosion recorder to the pipe component.

4. The system of claim 1, further comprising a packer disposed in the wellbore between the first corrosion recorder and the second corrosion recorder, wherein the control system is configured to generate a corrosion log of the wellbore using the first corrosion sensor data and the second corrosion sensor data, and wherein the first corrosion recorder corresponds to a first depth interval in the corrosion log and the second corrosion recorder corresponds to a second depth interval in the corrosion log.

5. The system of claim 1, wherein the pipe component comprises a casing.

6. The system of claim 4, wherein the packer comprises a feed-through packer disposed in a first section of the wellbore, wherein the feed-through packer is configured to:

seal on a wall of the wellbore and a wall of the pipe component, and allow a feeding through of the optical fiber cable from the first section of the wellbore to a second section of the wellbore.

7. The system of claim 1, wherein the control system is configured to:

determine a wall thickness of a predetermined section of the pipe component using the first corrosion sensor data and the second corrosion sensor data;

determine whether the wall thickness of the predetermined section satisfies a predetermined criterion; and terminate, in response to determining that the predetermined section fails to satisfy the predetermined criterion, a production operation at the wellbore.

8. The system of claim 1, wherein the first corrosion recorder is configured to:

obtain, from the control system and over the optical fiber cable, a command to generate the first corrosion sensor data; and generate, in response to obtaining the command, the first corrosion sensor data using the first magnetic field receiver and the first magnetic field transmitter.

9. The system of claim 1, wherein the control system is configured to:

transmit, over the optical fiber cable, a first command to the first corrosion recorder; and transmit, over the optical fiber cable, a second command to the second corrosion recorder, wherein the first corrosion sensor data is generated in response to the first corrosion recorder obtaining the first command, and wherein the second corrosion sensor data are generated in response to the second corrosion recorder obtaining the second command.

10. An apparatus comprising:

a sealed case coupled to a pipe component disposed in a wellbore within a well environment;

a first corrosion recorder coupled to the pipe component and disposed within the sealed case, the first corrosion recorder comprising:

a first magnetic field transmitter, a first magnetic field receiver, wherein the first magnetic field transmitter and the first magnetic field receiver are configured to generate first corrosion sensor data;

a second corrosion recorder coupled to the pipe component and disposed within the sealed case, the second corrosion recorder comprising:

a second magnetic field transmitter, a second magnetic field receiver, wherein the second magnetic field transmitter and the second magnetic field receiver are configured to generate second corrosion sensor data;

wherein the first corrosion recorder and the second corrosion recorder are separated by a predetermined distance within the wellbore, wherein the first corrosion sensor data describes a first portion of the pipe component disposed in the wellbore, wherein the second corrosion sensor data describe a second portion of the pipe component that is different from the first portion, wherein the first corrosion recorder and second corrosion recorder are permanently installed in the wellbore during production operations and are configured to continuously monitor pipe corrosion over a life of a well;

a fiber optic connector configured to couple to an optical fiber cable;

a communication interface coupled to the fiber optic connector;

a processor coupled to the first corrosion recorder, second corrosion recorder and the communication interface; and a memory coupled to the processor, wherein the memory comprises instructions configured to perform a method comprising:

obtain, over the optical fiber cable, a command to generate the first and second corrosion sensor data, generate the first and second corrosion sensor data using the first corrosion recorder and the second corrosion recorder, and transmit the first and second corrosion sensor data over the optical fiber cable using the communication interface, wherein the communication interface is configured to transmit, over the optical fiber cable, the first and second corrosion sensor data to a control system disposed on a well surface, wherein the control system is configured to:

perform a well simulation of the wellbore using the first and second corrosion sensor data obtained over time from the apparatus, pipe thickness data, and pipe parameters; and determine a predicted pipe replacement date for the well using the well simulation.

11. The apparatus of claim 10:

wherein the magnetic field transmitter is configured to transmit magnetic flux waves through a ferromagnetic material to cause a magnetic field;

wherein the magnetic field receiver is configured to detect a flux leakage caused by a defect in the ferromagnetic material.

12. The apparatus of claim 10, wherein the memory is configured to store the corrosion sensor data.

13. The apparatus of claim 10, wherein the method further comprises recording the corrosion sensor data after the apparatus receives a command to start to determine the corrosion sensor data;

wherein the method further comprises generating a corrosion log using the corrosion sensor data;

wherein the method further comprises transmitting, using the optical fiber cable, and the communication interface, the corrosion log to the control system.

14. A method comprising:

transmitting, by a control system and over an optical fiber cable, a first command to a first corrosion recorder in a wellbore;

transmitting, by the control system and over the optical fiber cable, a second command to a second corrosion recorder in the wellbore, wherein the first corrosion recorder and the second corrosion recorder are separated by a predetermined distance within the wellbore, wherein the first corrosion recorder and the second corrosion recorder are permanently installed in the wellbore during production operations and are configured to continuously monitor corrosion of a pipe component over a life of a well;

obtaining, by the control system in response to transmitting the first command and over the optical fiber cable, first corrosion sensor data from the first corrosion recorder;

obtaining, by the control system in response to transmitting the second command and over the optical fiber cable, second corrosion sensor data from the second corrosion recorder, wherein the first corrosion sensor data and the second corrosion sensor data are generated using a plurality of magnetic field receivers and a plurality of magnetic field transmitters in each of the first and second corrosion recorders and transmitted via communication interfaces in each of the first and second corrosion recorders coupled to the optical fiber cable, and wherein the first corrosion sensor data describes a first portion of the pipe component disposed in the wellbore, and wherein the second corrosion sensor data describe a second portion of the pipe component that is different from the first portion;

performing, by the control system, a well simulation of the wellbore of one or more wells using corrosion sensor data obtained over time from the first corrosion recorder, the second corrosion recorder, pipe thickness data, and pipe parameters; and determining, by the control system, a predicted pipe replacement date for the one or more wells using the well simulation.

15. The method of claim 14, wherein the control system adjusts one or more production parameters of a production operation at the wellbore based on the first corrosion sensor data, the pipe thickness data, and/or the well simulation of the wellbore of the one or more wells at the first portion of the pipe component.

16. The method of claim 14, further comprising:

performing a pipe replacement operation based on the well simulation, using the first corrosion sensor data, the pipe thickness data, the pipe parameters, at a first depth interval of the wellbore of the one or more wells.

17. The method of claim 14, further comprising:

performing a pipe replacement operation based on the well simulation, using the second corrosion sensor data, the pipe thickness data, the pipe parameters, at a second depth interval of the wellbore of the one or more wells.

* * * * *